INVENTOR
NESTOR SABI,

INVENTOR
NESTOR SABI,

INVENTOR
NESTOR SABI,
BY
*John E. Hubbell*
ATTORNEY

Feb. 5, 1957 N. SABI 2,780,362
MULTI-TRAY CLARIFIER
Filed Dec. 21, 1953 5 Sheets-Sheet 4

INVENTOR
NESTOR SABI,
BY
John E. Hubbell
ATTORNEY

Feb. 5, 1957  N. SABI  2,780,362
MULTI-TRAY CLARIFIER

Filed Dec. 21, 1953  5 Sheets-Sheet 5

INVENTOR
NESTOR SABI,
BY
John E. Hubbell
ATTORNEY

# United States Patent Office 2,780,362
Patented Feb. 5, 1957

2,780,362

MULTI-TRAY CLARIFIER

Nestor Sabi, Flushing, N. Y., assignor to Dorr-Oliver Incorporated, a corporation of Delaware Application December 21, 1953, Serial No. 399,464

4 Claims. (Cl. 210—55)

The present invention relates to the construction and use of multi-tray clarifiers in clarifying liquids containing suspended solids. The invention is well adapted for use in the clarification of juices and liquids treated in the manufacture of cane and beet sugar, but may be used for other purposes.

General objects of the present invention are to simplify and lower the construction cost of multi-tray clarifiers employed in such clarification, and to provide an improved method of effecting such clarification. The multi-tray clarifiers which I now prefer to use in the practice of my invention are similar in many respects to, and are improvements on multi-tray clarifiers heretofore known, such for example as the clarifier shown and described in the Weber Patent 2,253,878 of August 26, 1941. Each of my improved clarifiers comprises a tank with generally horizontal, superposed, trays or partitions dividing the tank space into an upper flocculation chamber, a lower sedimentation and thickening chamber, and a plurality of intermediate superposed clarifying chambers. Rakes secured to a rotating central vertical shaft element are arranged to move sedimented solids or "mud" on and immediately above the bottom walls of the different clarifying chambers, to outlets in the bottom walls of the different compartments.

The multi-tray clarifiers which I have devised for use in carrying out the present invention, comprise novel means for separately passing liquid to be clarified from the flocculation chamber into the different clarifying chambers through a single vertical central passage or channel. Said novel means are characterized by the relatively large areas and the disposition of the lateral outlets or flow paths through which the liquid can separately pass from the supply channel to the different clarifying chambers without significant risk of rupture of the flocs entrained by the liquid passing into the channel from the flocculation chamber. The sedimented solids or "mud" accumulating in the lower portion of each upper clarifying chamber are discharged through an outlet or opening in the bottom wall of the chamber adjacent but external to the central feed channel.

In one desirable form of the invention, the central passage or channel is surrounded by a plurality of spaced apart, coaxial rings or cylindrical sections. Each of said rings extends upward from the central opening in the bottom wall of the corresponding chamber through a portion of the latter. In this form of the invention the lower portion of each cylinder section may advantageously be surrounded by an uprising flange portion of an adjacent partition. Each partition at the bottom of an intermediate clarifying section is formed with one or more depending mud spouts. Each such spout is adjacent but external to the central opening in the partition from which the spout depends. Each mud spout depending from one partition is advantageously in vertical alignment with mud spouts depending from other partitions. Each of said cylinder sections is supported by arms connected to and extending outwardly away from the rotating central shaft. Importantly also, each cylinder section, except the topmost one, is in overlapping relationship with the associated depending spout. In this way, the mud descending through the spouts is prevented from mingling with the feed liquor as the latter moves radially past the spouts into the respective clarification chambers.

In another desirable form of the invention, the central passageway for the downflow of feed liquor is the space within a tubular member having its upper end in the space between the flocculation chamber and the bottom wall of the adjacent clarifying compartment, and having its lower end at or slightly below the level of the central portion of the partition between the two lowermost compartments. Said tubular member is formed with suitably large wall ports opening into the clarifying chambers between the upper and lower ends of said tubular member. In the last mentioned form of the invention, each partition through which said tubular member extends may be formed with a simple circular opening coaxial with but larger in diameter than the portion of the tubular member extending through the opening. The embodiment of the invention last mentioned is characterized by its structural simplicity and by the relatively small amount of metal required to form the intermediate partitions and said tubular body.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

The embodiment of the invention shown by way of illustration and example in Figs. 1–7, comprises a clarifier structure including a vertical tank A separated into a plurality of superposed chambers by shallow conical partitions B and $b$. Each of said partitions has its concave side facing upwardly. The partition $b$ forms the bottom wall of a flocculation chamber C at the upper end of the tank. As shown, there are three similar partitions B, each of which forms the bottom wall of a corresponding one of three intermediate sedimenting and clarifying chambers D. The lower partition B separates the lowermost compartment D from a bottom compartment DA. The latter normally operates both as a clarifying chamber and as a chamber which receives and thickens the liquid entraining solids discharged directly into the chamber DA from each of the chambers D, as well as the feed liquid passing into the chamber DA directly from the central feed channel, as is hereinafter explained. The partially thickened liquid and sedimented solids mixture accumulating on and immediately above each of the trays D are worked toward a central outlet E in the bottom wall of the corresponding tray B by rake arms F. The latter are supported and rotated by a central shaft G suspended from rotating mechanism H mounted on the upper end wall of the tank A. The mechanism H may be of well known conventional form and need not be further described herein. The shaft G also supports and rotates the rake arms F' and F² respectively above and adjacent the bottom walls of the compartments C and DA.

Adjacent its upper end, the shaft G supports horizontal sweep arms I located in a foam chamber J. The foam chamber J is shown as a cylindrical upward extension of the flocculation chamber C. The chamber J is coaxial with, but smaller in diameter than the chamber C. The arms I work foam and cane stalk and leaf fragments and the like to a foam discharge conduit J'. The cane juice or other liquid to be clarified is passed into the foam chamber J through a feed pipe K. At its lower end the shaft G carries a conical plow or scraper L rotating in a conical hopper-like central portion M of the bottom wall of the tank. The lower end of the portion M opens into a valved mud discharge pipe M'.

The apparatus shown in Figs. 1 to 7, insofar as it has been specifically described, includes nothing claimed as novel herein. However, the apparatus shown in Figs. 1 to 7, and now to be described, comprises novel means for passing liquid to be clarified from the flocculation chamber C into the different clarification chambers D and DA, without significant contamination of the liquid passing into the different clarification chambers by solids thickened in said chambers.

Figure 1:
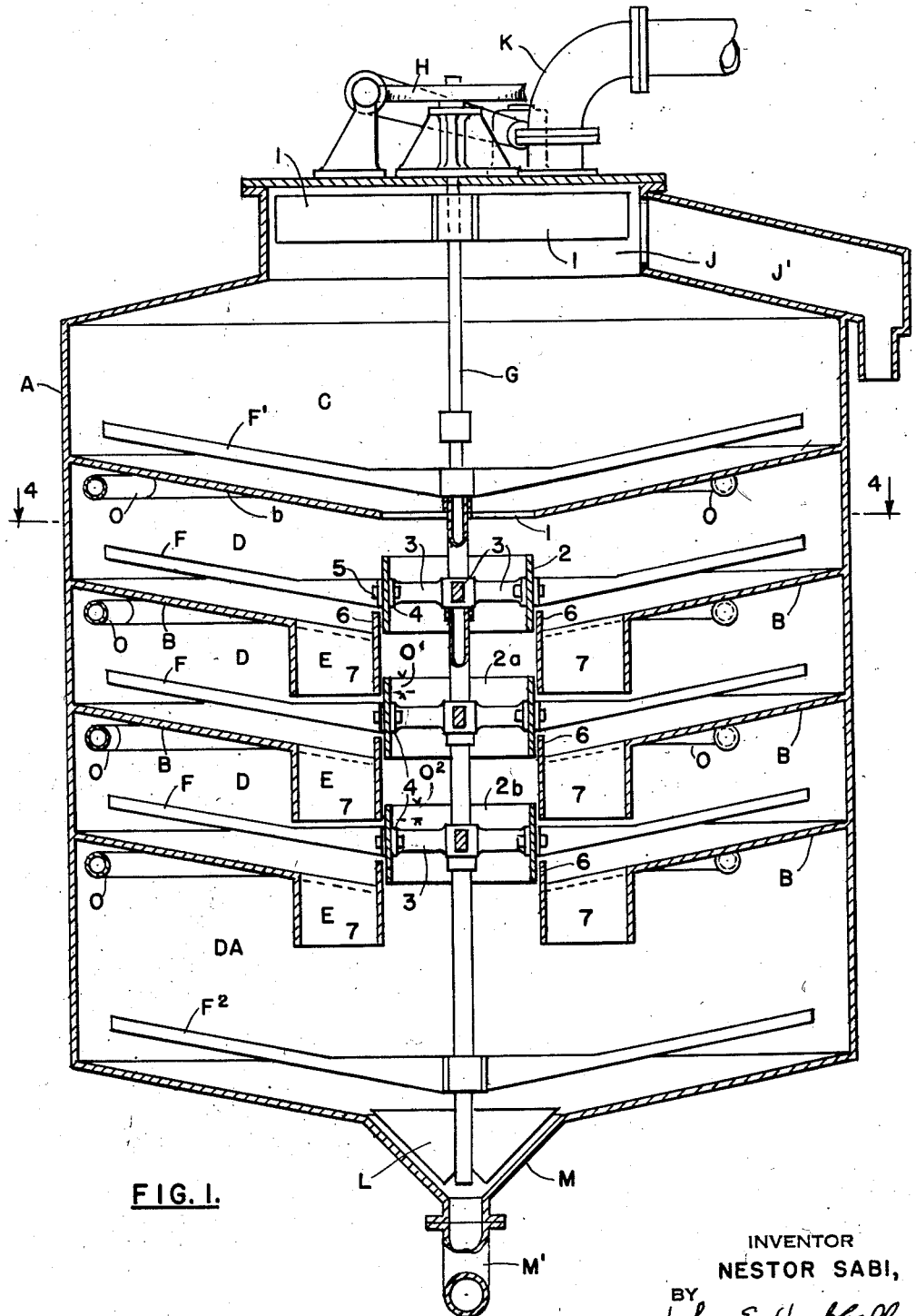
Fig. 1 is an elevation of one embodiment of my improved clarifier, in section on the vertical plane 1—1 of Fig. 4.
Figure 2:
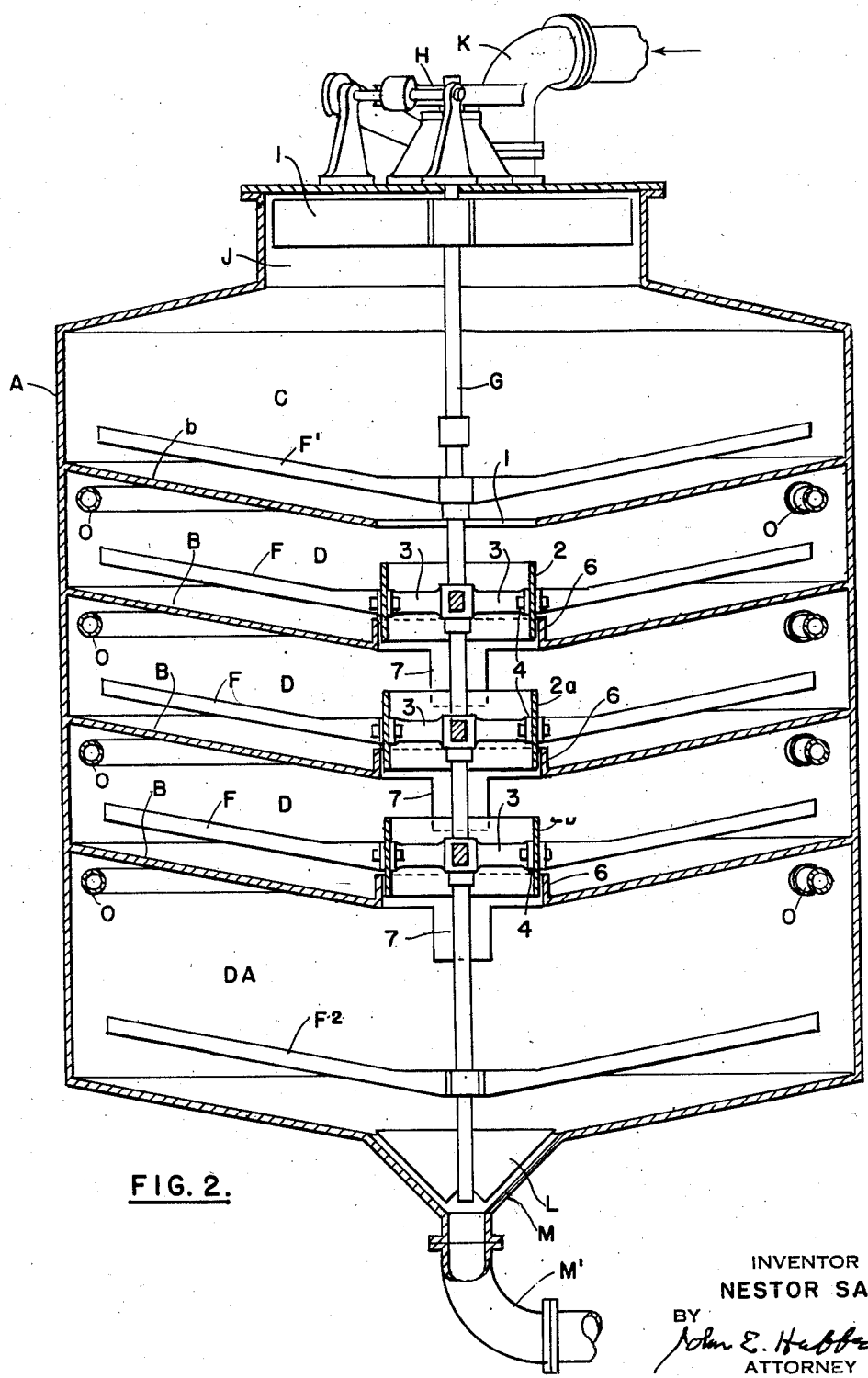
Fig. 2 is an elevation of the clarifier shown in Fig. 1, in section on the vertical plane 2—2 of Fig. 4.
Figure 3:
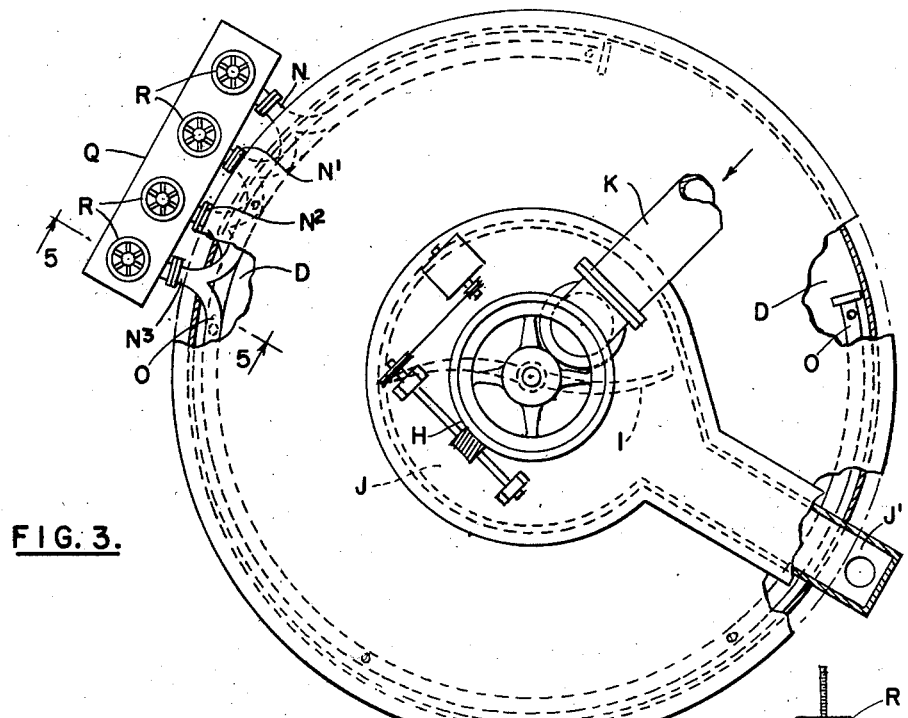
Fig. 3 is a plan view of the clarifier shown in Figs. 1 and 2 with portions of its upper end wall broken away.

As shown in Figs. 1 and 2, liquid which has been subjected to a flocculation action in the chamber C passes out of that chamber through a central opening 1 in the partition b which forms the bottom wall of the chamber. The opening 1 is coaxial with and here shown as being at a level some distance above the upper end of a sheet metal ring or cylinder section 2 which is coaxial with and of approximately the same diameter as the opening 1. The section 2 is connected to the shaft G by a plurality of arms 3 extending radially away from the shaft G. As diagrammatically shown, there are four radial arms 3 spaced 90° apart and integrally connected by a hub portion surrounding and welded or otherwise attached to the center shaft G. Each arm 3 is provided at its outer end with a transverse flange portion shown as in the form of a section of a cylinder 4 which fits against the inner side of the section 2. As shown, each part 4 is rigidly connected to the cylinder section 2 and to the inner end of the adjacent rake arms F by bolts 5.

Figure 7:
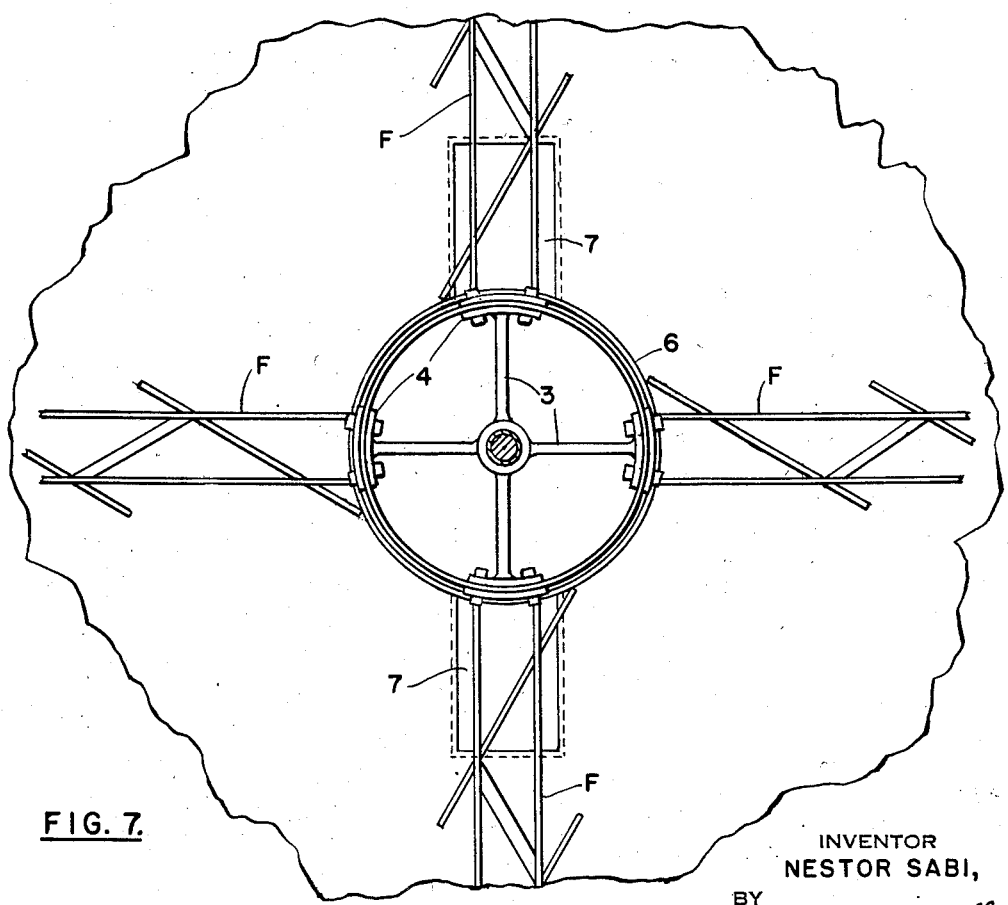
Fig. 7 is an enlarged reproduction of a portion of the plan section shown in Fig. 4.

The lower end portion of the cylinder section 2 extends into telescopic engagement with a cylindrical flange portion 6 of the partition forming the bottom wall of the uppermost clarifying chamber D. The flange 6 is in position to deflect thickened solids, moved toward the center of the lower portion of the uppermost chamber D by the rake arms F, into one or more mud spouts 7 attached to and depending from the uppermost partition B. As shown by Figs. 1, 2 and 7, there are two mud spouts 7 at opposite sides of the shaft G attached to and depending from the under side of the uppermost partition B. The lower ends of the mud spouts 7 which depend from the upper and intermediate partitions B, overlap the upper portions O' and O² of cylinder sections 2a and 2b, respectively. This overlapping arrangement is a safe-guard against mingling of the descending mud with the feed liquid passing radially from the central space surrounded by the sections 2a and 2b into the spaces above and below the intermediate partition B.

Figure 6:
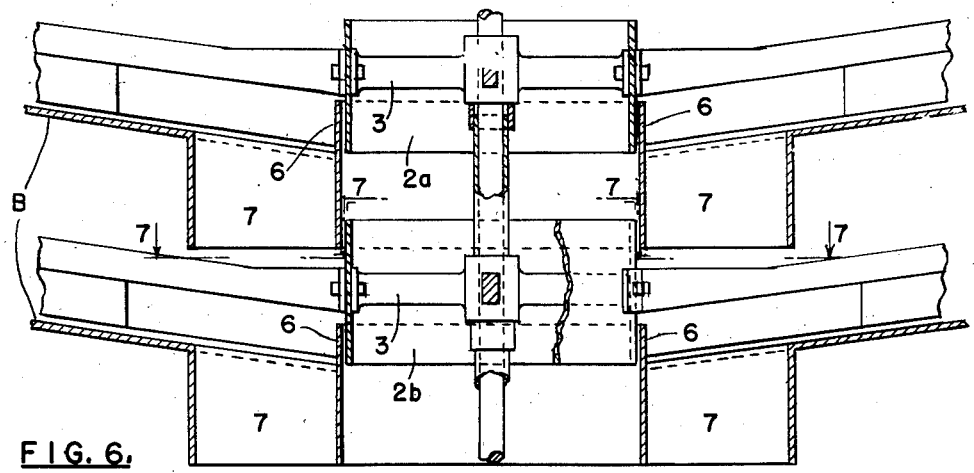
Fig. 6 is an enlarged reproduction of a portion of the clarifier shown in elevation in Fig. 1.

As shown in Figs. 1, 2 and 6, the two lower partitions B are formed with uprising flanges 6 which respectively surround the lower ends of superposed cylinder sections 2a and 2b. Each of the sections 2a and 2b may be a replica of the section 2 and is similarly supported by the shaft G through corresponding radial arms 3. Advantageously and as shown, the internal diameter of the opening 1 in the partition b is approximately equal to the outside diameter of each of the cylinder sections 2, 2a and 2b. The telescopic relation of the lower portion of each of the sections 2, 2a and 2b with the flange 6 extending upward from the corresponding partition B, prevents any significant tendency to flow of liquid from the clarifying section into which the flange 6 extends, into the space within and directly below the outer side of the corresponding cylindrical part 2, 2a or 2b.

In normal operation, clarified liquid is withdrawn from the upper portion of each of the three chambers D and the chamber DA through corresponding riser pipes N, N', N² and N³. Each of those pipes is external to the tank A and has its lower end connected to a draw-off pipe O within the corresponding clarifying chamber D or DA. As shown, each draw-off pipe O is in the form of an arc of about 360° which is adjacent the peripheral wall of the tank and also adjacent the partition b or B at the top of the clarification chamber in which that pipe O is located. Each of the riser pipes has its lower end connected to the corresponding draw-off pipe O by a bent pipe connection P. Clarified liquid passing away from the tank A through each of the riser pipes N–N³ overflows into an overflow tank Q into which the riser pipe extends. The effective overflow level of each riser pipe may be regulated by vertical adjustment of a tubular member n in telescopic association with the riser pipe. As is collectively shown in Figs. 3 and 5, each tubular member n has an uprising threaded extension on which a hand wheel R is threaded to raise or lower the corresponding element n when rotated. The clarified liquid overflowing from the pipes N–N³ into the tank Q passes away from the tank Q through an outlet pipe S. The parts just described for withdrawing clarified liquid from the tank A are collectively shown in Figs. 2, 3, 4 and 5 and are of a conventional type which has long been in general use.

The dimensions of a clarifier of the type shown in Figs. 1 to 7 may vary widely in accordance with the conditions of operation and in particular, with the normal clarifier capacity required. By way of illustration and example, and not by way of limitation, it is noted that the clarifier shown in Figs. 1 to 3 may well have a diameter of 16 feet, and that the vertical distance between each adjacent pair of trays D and between the uppermost tray B and the tray D may be about 2¼ feet, and that the vertical distance between the upper edge of each of the cylinders 2, 2a and 2b and the lower peripheral edge of the central opening in the partition b or B immediately above each of said cylinders may be about ⅞ of a foot, and that the diameter of the central opening in each of said partitions may be about 3 feet.

In accordance with regular practice, the flocculated liquid should ordinarily pass down through the central opening 1 with a linear velocity not greater than about 1½ feet per second. With the above assumed dimensions and the further assumption that about 25% of the liquid passing from the flocculating chamber C through the central opening 1 will pass into each of the chambers D and DA prior to significant admixture with solids thickened in said chambers, the velocity of flow of the liquid passing into the chamber DA from the lower end of the cylinder 2b will be only about 25% of the velocity of flow downward through the central opening 1. The mud spouts 7 reduce the aggregate free flow area between the upper edges of each of the cylinder sections 2a and 2b and the partition B above the section only to a relatively small extent, since the angular extent of each of the two mud spouts 7 extending into the two lower chambers D is a relatively small fraction of the total angular extent of the central aperture 1. Thus the maximum velocity of flow away from the central channel into each of the two lower chambers B will be appreciably less than 1½ feet per second with the foregoing assumptions.

The maximum dimensions of each of the larger flocs formed in the flocculating chamber C will ordinarily not exceed ⅔ of an inch. Thus as the flocs move slowly from the central path into one or another of the clarifying compartments D there is little tendency for the flocs to be broken or reduced in size by contact with the stationary or rotating apparatus alongside the flow path through which the liquid to be clarified passes from the chamber C into the chambers D and D$a$.

Figure 8:
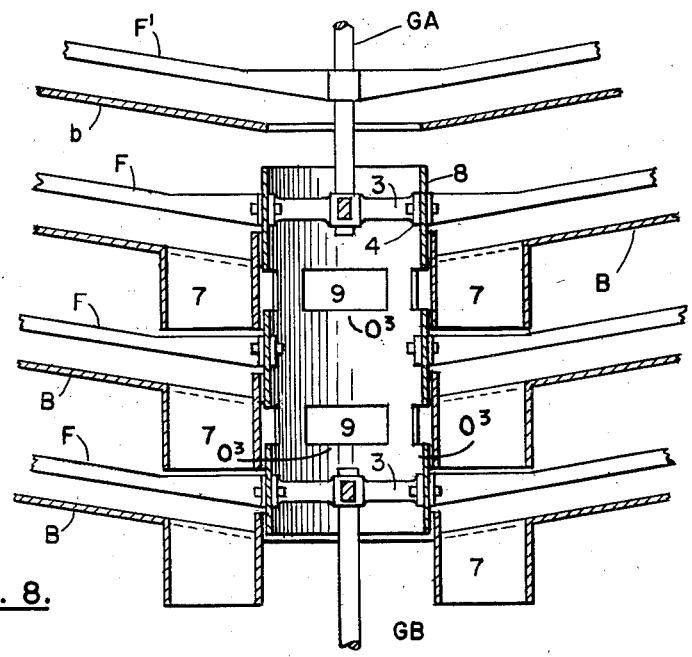
Fig. 8 is an elevation in section of a portion of a clarifier of modified construction.
Figure 9:
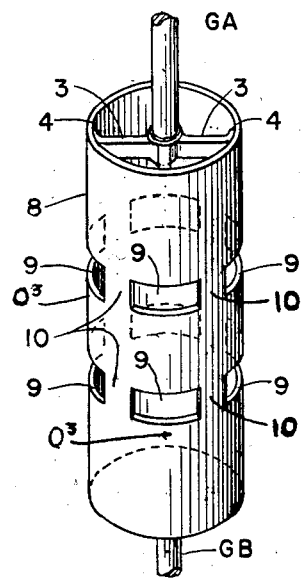
Fig. 9 is a perspective view illustrating a portion of the structure shown in Fig. 8.

As previously stated, the apparatus used in the practice of the present invention may take various forms and in Figs. 8 and 9 I have illustrated an embodiment of the invention which does not differ significantly in its general mode of operation from the apparatus shown in Figs. 1 to 7, but is simpler and less expensive to construct. The structural features of the apparatus shown in Figs. 1 to 7 and not included in the apparatus shown in Figs. 8 and 9, are confined to the rotating structure between the rake arms F' and F². As shown in Figs. 8 and 9, the rotating structure between the rake arms F' and F² comprises a one-piece cylinder 8 having its open upper end at a level which may normally be displaced downwardly away from the partition $b$ to the same extent as is the upper edge of the cylinder section 2 of the construction first described. Similarly, the cylinder 8 may have its open lower end at about the same distance from the bottom wall of the tank A as is the lower end of the cylinder section 2$b$.

Figure 4:
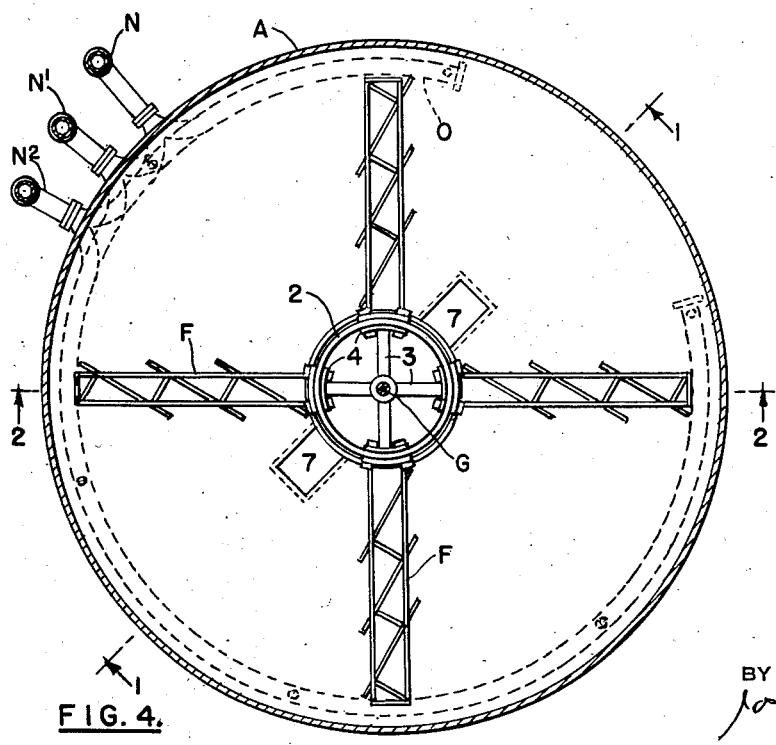
Fig. 4 is a plan section on the horizontal plane 4—4 of Fig. 1.
Figure 5:
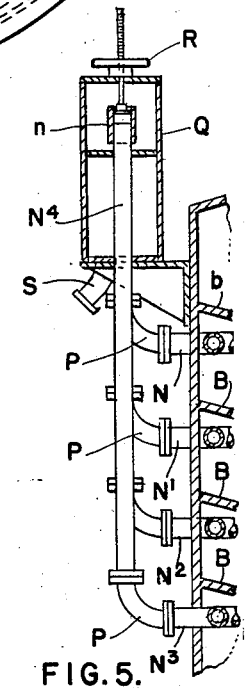
Fig. 5 is an elevation of a portion of the clarifier shown in section on the line 5—5 of Fig. 3.

The central rotating structure shown in Fig. 8 differs from the shaft G and arms of the construction first described, in that it comprises vertically displaced upper and lower shaft sections GA and GB which are connected to upper and lower end portions, respectively, of the cylinder 8 by arms 3. Those arms may be similar in form and in their hub connections, to the arms 3 of the construction of Figs. 1 to 7. The shaft portions GA and GB are respectively secured to the upper and lower ends of the cylinder 8. The outer end portions 4 of the arms 3 of Figs. 8 and 9 may be secured to the adjacent end portions of the cylinder 8, generally as the arms 3 of Figs. 1 and 4 are secured to the cylinder sections 2.

As shown, the cylinder 8 is formed with lateral outlets 9 opening into the upper portion of each of the two lowermost chambers D, and forming outflow paths similar to those between the ends of the cylinder 2$a$ and the adjacent ends of the cylinders 2 and 2$b$. As shown, the lateral outlets from the cylinder 8 opening into each of the two lower compartments B comprise four horizontal slots 9 in the cylinder wall, each of which may have an angular extent of about 80° and a vertical extent about equal to the distance between the adjacent edges of the cylinder sections 2$a$ and 2$b$ of the construction first described. The strips 10 between the adjacent ends of adjacent slots 9 serve to provide the strength required to resist the longitudinal and torsional stresses to which those strips are subjected.

In the normal operation of each embodiment of the invention illustrated and described in detail herein, the individual flocs formed in the flocculating chamber may vary widely in size. However, in any normal operating condition, the maximum flocs formed will have a maximum dimension or extent of about half an inch. In each of the various forms illustrated, the invention is characterized by the lateral flow of liquid away from the central downflow passage directly into associated intermediate clarifying compartments. In said forms, each stream of liquid flows directly away from the central passage in the sense that it is not transversely deflected as streams discharged through ports 46 of the previously mentioned Weber patent are deflected by the associated baffles 48. Furthermore, each of the streams flowing transversely away from said central passage is free to expand in transverse cross section in a manner prevented by the walls 47 surrounding the transversely moving streams of said Weber patent. In consequence, if each lateral outlet has minimum horizontal and vertical dimensions each not less than about a half inch, the flocs of maximum size will pass freely through said outlets when the flow velocity is not greater than 1½ feet per second without a significantly large number of injurious contacts of flocs with the margins of the lateral outlets from the central channel.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. A multi-tray clarifier, comprising a tank having a plurality of flat cone shaped partitions in vertical spaced relation to provide said clarifier with an uppermost flocculation chamber, a lowermost thickening chamber, and a plurality of clarifying chambers therebetween, each of said partitions being provided with a central opening therein, each of said partitions below the uppermost partition having another opening adjacent said central opening, all of said other openings being in substantial registry, a plurality of peripherally continuous passage defining members, one for each of said partitions below said uppermost partition, each of said passage defining members being disposed within the central opening of its associated partition in vertical spaced relation with each other of said passage defining members and being fixed to its associated partition, whereby liquid flowing downwardly through said passage defining means flows into each of said clarifying chambers through the space between said passage defining means, and a plurality of mud spouts, one for each of said partitions below said uppermost partition, each of said mud spouts being secured to its associated partition and depending therefrom and being in registry with the other opening in said associated partition, said mud spouts being vertically spaced from each other and collectively forming a mud passage separate and distinct from said liquid passage, whereby mud from said clarifying chambers moves downwardly toward said thickening chamber by a path separate and distinct from the path of said liquid.

2. A multi-tray clarifier, comprising a tank having a plurality of flat cone shaped partitions in vertical spaced relation to provide said clarifier with an uppermost flocculation chamber, a lowermost thickening chamber, and a plurality of clairfying chambers therebetween, each of said partitions being provided with a central opening therein, each of said partitions below the uppermost partition having a pair of other openings adjacent said central opening and on opposite sides thereof, the said other openings on one side of said central openings being in substantial registry and the said other openings on the opposite side of said central opening being in substantial registry, a plurality of peripherally continuous passage defining members, one for each of said partitions below said uppermost partition, each of said passage defining members being disposed within the central opening of its associated partition in vertical spaced relation with each other of said passage defining members and being fixed to its associated partition, whereby liquid flowing downwardly through said passage defining means flows into each of said clarifying chambers through the space between said passage defining means, and a plurality of mud spouts, two for each of said partitions below said uppermost partition, each of said mud spouts being secured to its associated partition and depending therefrom and being in registry with one of said other openings in said associated partition, all of the mud spouts on one side of said central openings being vertically spaced from each other and all of the mud spouts on the opposite side of said central openings being vertically spaced from each other, whereby each set of mud spouts forms a separate passage for mud to move downwardly from said clarifying chamber to said thickening chamber, to thereby minimize the mixing of mud with liquid.

3. A multi-tray clarifier comprising a tank and superposed partitions therein forming an upper flocculation chamber, a lower thickening chamber, and a plurality of superposed clarifying chambers between said flocculation and thickening chambers, each of said partitions being formed with a central opening, means forming a vertical feed channel extending through said central openings and including channel wall sections surrounding said channel and longitudinally displaced from one another to form a lateral outlet which is intermediate the partitions respectively above and below each clarifying chamber and through which said channel extends, and having a minimum cross sectional area great enough for the free passage therethrough of flocs of the largest size normally formed in the flocculation chamber, and means providing a channel adjacent but separate and distinct from and external to the first mentioned channel, for the downflow of thickened solids from each upper clarifying chamber, and means for regulating the rate at which clarified liquid is withdrawn from the upper portion of each clarifying compartment and thereby preventing or minimizing the flow of liquid from the clarifying chambers into said central channel, said means defining said vertical feed channel comprising separately aligned cylindrical sections each extending upward into a corresponding clarifying chamber from its bottom wall to a level intermediate the central portions of the partitions at the top and bottom of the chamber, said partition at the bottom of each clarifying chamber being provided with an upwardly extending flange surrounding the corresponding cylinder section for preventing significant flow into said channel from said compartment through the joint space between said flange and cylinder section.

4. A multi-tray clarifier comprising a tank and superposed partitions therein forming an upper flocculation chamber, a lower thickening chamber, and a plurality of superposed clarifying chambers between said flocculation and thickening chambers, each of said partitions being formed with a central opening, means forming a vertical feed channel extending through said central openings and including channel wall sections surrounding said channel and longitudinally displaced from one another to form a lateral outlet which is intermediate the partitions respectively above and below each clarifying chamber and through which said channel extends, and having a minimum cross sectional area great enough for the free passage therethrough of flocs of the largest size normally formed in the flocculation chamber, and means providing a channel adjacent but separate and distinct from and external to the first mentioned channel, for the downflow of thickened solids from each upper clarifying chamber, and means for regulating the rate at which clarified liquid is withdrawn from the upper portion of each clarifying compartment and thereby preventing or minimizing the flow of liquid from the clarifying chambers into said central channel, said means forming a vertical feed channel comprising a cylinder having an open upper end intermediate the partition wall at the bottom of the flocculation chamber and the partition wall at the bottom of the immediately subjacent clarifying chamber, said cylinder having its open lower end in position to discharge feed liquid into said lower thickening compartment, said cylinder being provided with lateral apertures for the separate outflow of liquid from said cylinder into said intermediate chambers.

References Cited in the file of this patent

UNITED STATES PATENTS

| 1,237,745 | Blomfield | Aug. 21, 1917 |
| 1,754,870 | Wickes | Apr. 15, 1930 |
| 2,233,641 | Ramsey | Mar. 4, 1941 |
| 2,253,878 | Weber | Aug. 26, 1941 |
| 2,343,836 | Weber | Mar. 7, 1944 |
| 2,377,875 | Geissler | June 12, 1945 |
| 2,470,076 | Warren et al. | May 10, 1949 |